(12) United States Patent
Yotoriyama et al.

(10) Patent No.: US 6,882,975 B2
(45) Date of Patent: Apr. 19, 2005

(54) METHOD, STORAGE MEDIUM, APPARATUS, SERVER AND PROGRAM FOR PROVIDING AN ELECTRONIC CHAT

(75) Inventors: Hiroaki Yotoriyama, Ohta-ku (JP); Tetsuya Akatsuka, Ohta-ku (JP)

(73) Assignee: Namco Ltd., Tokyo (JP)

( * ) Notice: Subject to any disclaimer, the term of this patent is extended or adjusted under 35 U.S.C. 154(b) by 219 days.

(21) Appl. No.: 10/154,978

(22) Filed: May 28, 2002

(65) Prior Publication Data

US 2002/0178011 A1 Nov. 28, 2002

(30) Foreign Application Priority Data

May 28, 2001 (JP) ........................................ 2001-159030

(51) Int. Cl.[7] ............................................. G10L 15/00
(52) U.S. Cl. ........................ 704/275; 704/260; 345/473
(58) Field of Search ................................ 704/270, 275, 704/260; 345/473, 758

(56) References Cited

U.S. PATENT DOCUMENTS 5,880,731 A * 3/1999 Liles et al. .................. 345/758
6,522,333 B1 * 2/2003 Hatlelid et al. ............. 345/474

FOREIGN PATENT DOCUMENTS

| JP | 04-261247 | 9/1992 |
| JP | 09-081353 | 3/1997 |
| JP | 09-138767 | 5/1997 |
| JP | 2000-099225 | 4/2000 |
| JP | 2000-207304 | 7/2000 |
| WO | WO 01/27879 A1 | 4/2001 |

* cited by examiner

*Primary Examiner*—Daniel Abebe
(74) *Attorney, Agent, or Firm*—Oliff & Berridge PLC

(57) ABSTRACT

A method for expressing a feeling and so on included in a speech of a player, more plainly, when the player has a chat through a network. The method for providing an electronic chat between a first apparatus controlling a first own player character and a second apparatus controlling a second own player character, through a network, comprises: inputting a speech data to the first apparatus; inputting a motion pattern of the first own player character to the first apparatus; sending a chat data including the speech data and the motion pattern to the second apparatus; receiving a chat data sent from the second apparatus; outputting a speech data included in the chat data received from the second apparatus; and moving and displaying the second own player character on the basis of a motion pattern included in the chat data received from the second apparatus.

14 Claims, 13 Drawing Sheets

| CONDITION | MOTION NUMBER |
|---|---|
| CONDITION 1 | MOTION 1 |
| | MOTION 2 |
| | ⋮ |
| CONDITION 2 | MOTION n |
| | MOTION n+1 |
| | ⋮ |
| ⋮ | ⋮ |

| MOTION NUMBER M1 | FIRST KEY FRAME | SECOND KEY FRAME | ... |
|---|---|---|---|
| JOINT a | (x1a, y1a, z1a) | (x2a, y2a, z2a) | ... |
| JOINT b | (x1b, y1b, z1b) | (x2b, y2b, z2b) | ... |
| ⋮ | ⋮ | ⋮ | ... |

| REGISTRATION NUMBER | SPEECH DATA | MOTION NUMBER | OUTPUT ORDER |
|---|---|---|---|
| #1 | HELLO ! | M1 | — |
| #2 | GOODY ! | M2 | 1 |
| | THANK YOU. | M3 | 2 |
| ⋮ | ⋮ | ⋮ | ⋮ |

FIG.13A

| REGISTRATION SIGN | MOTION (MOTION NUMBER) |
|---|---|
| +b | BOW (M1) |
| +d | DANCE (M2) |
| +w | WAVE (M3) |
| ⋮ | ⋮ |

FIG.13B

+b  　　　HELLO !

METHOD, STORAGE MEDIUM, APPARATUS, SERVER AND PROGRAM FOR PROVIDING AN ELECTRONIC CHAT

BACKGROUND OF THE INVENTION

1. Field of the Invention

The invention relates a method, a storage medium, an apparatus, a server and a program for providing an electronic chat through a network.

2. Description of Related Art

In recent years, a conversion system which is a so-called chat is known in that a plurality of apparatuses are connected to each other through a network, and thereby a plurality of players can exchange messages with each other and have conversations at a real time.

Further, in recent years, a network game is developed that a plurality of game apparatuses are connected to each other through a network, and a plurality of players have one game space in common with each other at the same time and enjoy playing one game. Some of the above-described network games can provide a chat.

That is, each player controls and moves his own player character in the game space, and develops the game according to a scenario of the game. While each player is playing the game, because a plurality of players have one game space in common with each other, his own player character controlled by the player may meet with another player character controlled by another player. In the case, because a game apparatus operated by the player sends a message to another game apparatus operated by the player controlling the character with which his own player character meets, at a real time, the players may be able to communicate with each other.

The main stream of already known chats is one for exchanging text messages including sentences and words between apparatuses. That is, when each apparatus which can provide a chat sends and receives messages, the apparatus displays the messages on a screen thereof at a real time. As described above, the chat is interesting for a player to make a text conversation at a good tempo. Therefore, because many players pay attention to generating messages as quickly as possible, there are many cases the content itself of the message is short relatively. As a result, it is difficult that the player exactly conveys his nuance, his delicate feeling, his impression and so on, which the player wants to convey to another player, by the chat, as his pleases.

SUMMARY OF THE INVENTION

The present invention was developed in view of the above-described problems.

It is an object of the present invention to express a feeling and so on included in a speech of a player, more plainly, when the player has a chat through a network.

In accordance with a first aspect of the present invention, a method for providing an electronic chat between a first apparatus (for example, a game apparatus 1304-1 shown in FIG. 1) controlling a first own player character and a second apparatus (for example, game apparatuses 1304-2 to 1304-n shown in FIG. 1) controlling a second own player character, through a network (for example, a network 1308 shown in FIG. 1), comprises: inputting a speech data to the first apparatus (for example, an input operating unit 10 shown in FIG. 5); inputting a motion pattern of the first own player character to the first apparatus (for example, an input operating unit 10 shown in FIG. 5); sending a chat data including the speech data and the motion pattern to the second apparatus (for example, a communication unit 40 shown in FIG. 5); receiving a chat data sent from the second apparatus (for example, a communication unit 40 shown in FIG. 5); outputting a speech data included in the chat data received from the second apparatus (for example, a speech display control unit 214, an image generation unit 230 and a display unit 30 shown in FIG. 5); and moving and displaying the second own player character on the basis of a motion pattern included in the chat data received from the second apparatus (for example, a character motion control unit 216, an image generation unit 230 and a display unit 30 shown in FIG. 5).

In accordance with a second aspect of the present invention, an apparatus (for example, a game apparatus 1304-1 shown in FIG. 1) for controlling an own player character, and providing an electronic chat with another apparatus (for example, game apparatuses 1304-2 to 1304-n shown in FIG. 1) controlling another own player character, through a network (for example, a network 1308 shown in FIG. 1), comprises: a section (for example, an input operating unit 10 shown in FIG. 5) for inputting a speech data thereto; a section (for example, a input operating unit 10 shown in FIG. 5) for inputting a motion pattern of the own player character thereto; a section (for example, a communication unit 40 shown in FIG. 5) for sending a chat data including the speech data and the motion pattern to another apparatus; a section (for example, a communication unit 40 shown in FIG. 5) for receiving a chat data sent from another apparatus; a section (for example, a speech display control unit 214, an image generation unit 230 and a display unit 30 shown in FIG. 5) for outputting a speech data included in the chat data received from another apparatus; and a section (for example, a character motion control unit 216, an image generation unit 230 and a display unit 30 shown in FIG. 5) for moving and displaying another own player character on the basis of a motion pattern included in the chat data received from another apparatus.

Herein, the speech data may be displayed as a text on a display or a monitor, or may be outputted as a sound from a speaker or the like. Further, the speech data may be both displayed as a text and outputted as a sound.

Further, the speech data may be inputted as a text with a key board, a pointing device, a touch panel or the like, as a written script with a private pen or the like, or as a sound with a sound recognition function The speech data which is sent or received as a chat data, may be a text data or a sound data expressing a speech content, or an identification number added to a text data or a sound data. That is, each apparatus may previously store a speech content (a text data, a sound data or the like) and an identification number which are corresponded to each other, and send or receive the identification number corresponding to the speech content through a network.

Further, the motion pattern which is sent or received as one part of the chat data, may be a motion data for moving the player character, or an identification number added to a motion data.

According to the method of the first aspect or the apparatus of the second aspect of the present invention, while a player have a chat through a network, when the player inputs a speech content and sends a speech data of the speech content to another apparatus, the player can specify a motion pattern of his own player character controlled by the player, and send the specified motion pattern with the inputted speech data to another apparatus. On the other hand, when an apparatus receives the speech data and the motion pattern of another own player character, the apparatus can output the received speech data, and move another own player character on the basis of the received motion pattern. Consequently, because the apparatus provides a chat with not only outputting the speech data but also moving the character on the basis of the motion pattern, it is possible to express a feeling and an impression which only a word cannot express. Further, because a feeling and an impression can be expressed in motions of the character, for example, in case players which uses different languages have a chat with each other and cannot understand the languages with each other, it is possible that the motions of the character convey players' feelings and impressions.

A system in which a network between a plurality of apparatuses can be realized may be a so-called peer to peer system in which a plurality of apparatuses function equally, or a system in which a server is provided between a plurality of apparatuses.

For example, in accordance with a third aspect of the present invention, a server is connectable to first and second apparatuses each of which comprises a section for sending a speech data and a motion code of an own player character, a section for receiving a predetermined data, a section for outputting a speech data received, and a section for moving and displaying another player character on the basis of a motion data received, through a predetermined communication line, and the server comprises: a section for storing a plurality of motion data and a plurality of motion codes which are corresponded to each other; a section for receiving the speech data and the motion code sent from the first apparatus; a section for extracting any one corresponding to the motion code received, from the motion data stored; and a section for sending the motion data extracted and the speech data received, to the second apparatus.

Preferably, the method of the first aspect of the present invention, comprises: storing a plurality of motion patterns and a plurality of predetermined input operations which are corresponded to each other, in the first apparatus; and determining any one of the motion patterns, which corresponds to any one of the predetermined input operations, to be inputted to the first apparatus, when the one of the predetermined input operations is inputted to the first apparatus.

The input operation may be a key input with a key board or the like, a shortcut input, or an input operation for selecting any one of objects displayed on a screen with a mouse pointer, a touch panel or the like. The key includes a character (text), a sign, a special character (text), a special sign and so on.

According to the method as described above, a player can input the motion pattern with a key. That is, in case a player inputs the speech data with a key board, the player can specify also the motion pattern with the key board. Therefore, because the motion pattern is corresponded to the key input, one section can realize both a section for inputting the speech data and a section for specifying the motion pattern. Consequently, because the player can determine the sent data without changing a member for inputting a speech and a motion, it is possible that the player inputs a message including the motion of the character more quickly in order to exchange the message, that is, in order to have a chat, at a real time.

Preferably, the above-described method comprises: storing the plurality of motion patterns and a plurality of predetermined displayed objects which are corresponded to each other, in the first apparatus; and determining any one of the motion patterns, which corresponds to any one of the predetermined displayed objects, to be inputted to the first apparatus, when the one of the predetermined displayed objects is inputted to the first apparatus.

The displayed object includes an icon, a shortcut, each item of a pull-down display, and so on, which are displayed on a screen.

According to the method as described above, the motion patterns and the displayed objects are corresponded to each other and stored in the apparatus. Consequently, when a player selects any one of the displayed objects, the player can specify any one of the motion patterns. For example, because the displayed objects are displayed on a screen so as to be selected with a pointing device such as a mouse pointer and so on, it is possible that a player specify a motion which the character takes only by selecting any one of the displayed objects displayed on the screen, without memorizing a key and a method for specifying each of the motion pattern.

When the displayed objects corresponding to the motion pattern respectively, are displayed on a screen, there is a limit to the number of displayed objects which can be displayed on the screen. For example, in case there are a large number of motion patterns or many types of motion patterns, it is necessary to increase the number of displayed objects according to the number of motion patterns, and to display the displayed objects on the whole screen. In the case, not only the displayed objects prevent a player from having a chat, but also a troublesome work of selecting a desired one of a large number of displayed objects displayed on the screen may be imposed on the player.

Accordingly, preferably, the above-described method comprises: displaying some of the predetermined displayed objects, which are determined according to a predetermined condition.

The predetermined displayed objects are displayed not only in a state all the displayed objects displayed on a screen are changed to other displayed objects. In case icons or the like are displayed on a predetermined window and scrolled with a scroll bar, the predetermined displayed objects may be displayed in a state a default of positions at which the displayed objects are displayed is changed. Further, it is needless to say that the type of the predetermined displayed objects may be changed to another type of displayed objects according to the input operation.

According to the method as described above, it is possible to display the displayed objects and to determine the type or the like of the displayed objects which are displayed according to the predetermined condition. For example, it is possible not to display all the displayed objects corresponding to all the motion patterns on a screen, but to display some of the displayed objects, corresponding to the motion patterns which are suitable for the state, that is, which corresponds to the condition, on the screen. Consequently, it is possible that a player is released from a troublesome work of searching the desired displayed object, and specifies the desired motion pattern speedy. For example, the condition is determined that a player enters a chat, the number of players having a chat increases, or the like. When the condition is met, some displayed objects corresponding to the motion patterns for greetings are displayed. When the speech data are exchanged at two or three times since the condition has been met, the displayed objects are changed to those corresponding to other motion patterns. As a result, it is possible to realize the display state in consideration of the mental state when the player operates a chat.

Preferably, the above-described method comprises: restricting the motion patterns which can be selected, by a predetermined condition.

According to the method as described above, it is possible to restrict a type of the motion patterns which a player can select, by a predetermined condition. For example, in case a chat system according to the present invention is adopted as one part of a network game, it is possible to restrict the number or the type of motion patterns which the player can select, by the condition such as the score of the network game, the number of opponent characters with which an own character controlled by the player fights in the network game, and so on. Consequently, because the motion patterns which can be selected is restricted by the condition, it is desired to increase an interest in the network game more and more, or to have a lot of conversations in a chat.

Preferably, the method of the first aspect of the present invention, comprises: sending the chat data further including a sequence data indicating an output order of the speech data and the motion pattern to the second apparatus; and controlling outputting the speech data and moving and displaying the second own player character, on the basis of a sequence data included in the chat data received from the second apparatus.

According to the method as described above, it is possible to add the sequence data indicating the output order of the speech data and the motion pattern to the chat data which is sent to another apparatus. That is, a player can not only input the speech data and specify the motion pattern, but also specify the output order of the speech data and the motion pattern. For example, it is possible that the player can specify the output order that his own player character speaks "HELLO!" and after bows, his own player character speaks "HELLO!" with bowing, his own player character bows and after speaks "HELLO!", or the like. Consequently, it is possible that the player not only enjoys a combination of the speech data and the motion pattern, but also emphasizes an impression conveyed to another player in a chat by devising the output order.

In a chat, the data is exchanged between apparatuses at a good tempo, and thereby the interest or the conversation may be increased more and more. However, if a player inputs the speech data, selects any one of the motion patterns, and specifies the output order of the speech data and the motion pattern, to make a message, particularly, more elaborate message the player makes, the longer the time required to make the message is. As a result, a player which receives the message may be bored.

In order to solve the problem, a sample of the message may be generated previously, and stored in the apparatus.

That is, the above-described method comprises: storing a plurality of speech and motion patterns including at least the speech data, the motion pattern and the sequence data in the first apparatus; selecting any one of the speech and motion patterns stored in the first apparatus; and sending the chat data including the one selected of the speech and motion patterns to the second apparatus.

The speech and motion pattern which is sent from the apparatus storing the speech and motion patterns to another apparatus may be an identification number for identifying each speech and motion pattern, or a data including the speech data, the motion pattern and the sequence data.

In consideration of a mind when a player operates a chat, there is a case it may be preferable that the character takes action in the input order of the speech data and the motion pattern.

Accordingly, preferably, the above-described method comprises: generating the sequence data on the basis of an input order of the speech data and the motion pattern.

Consequently, because the output order is determined on the basis of the input order, it is unnecessary that a player determines the sequence data indicating the output order. As a result, it is possible to determine the chat data more quickly.

Preferably, the method of the first aspect of the present invention, comprises: inputting the speech data including a predetermined output control code to the first apparatus; and outputting the speech data in an output state and/or at an output speed, determined according to a predetermined output control code included in the speech data received from the second apparatus.

According to the method as described above, it is possible that a player determine the output state and/or the output speed of the speech data. Consequently, for example, when the player changes the output speed, it is possible to represent "a pause" of the speech of the character. Further, for example, when the player changes the output state, it is possible to specify a size, a format, a color or the like of a text displayed when the speech data is displayed and outputted as the text, or to change a volume, a tune or the like of a sound generated when the speech data is outputted as the sound.

When a player makes a character speak with taking a motion in a chat, there is a case the player wants the character to speak a next word after taking a motion. For example, when the player makes the character bow with speaking "HELLO!", there is a case the player wants the character to speak a next word after bowing. Further, there is a case the player wants the character to finish speaking at the same time as finishing taking a motion. For example, there is a case the player wants the character to speak "HELLO!" after the character starts bowing before the character finishes bowing. In the case, it is preferable to adjust the output timing and the output speed of the speech according to the type of the motion which the character takes.

Therefore, the method of the first aspect of the present invention, comprises: outputting the speech data in an output state and/or at an output speed, determined according to the motion pattern included in the chat data received from the second apparatus.

According to the above-described method, because the output speed of the speech data is changed according to the motion pattern, it is possible to synchronize the speech of the character with the motion of the character.

Preferably, the method of the first aspect of the present invention, comprises: analyzing a content of the speech data included in the chat data received from the second apparatus; and moving and displaying the second own player character on the basis of the motion pattern corresponding to the content of the speech data.

According to the method as described above, even if the motion pattern is not inputted to the apparatus, it is possible to move and display the character on the basis of the motion pattern according to the content of the speech data. For example, in case a word or a sentence is corresponded to the motion pattern and stored in the apparatus previously, when the speech data including the word or the sentence is inputted to the apparatus, it is possible to make the character take the motion pattern corresponding to the content of the speech data. Consequently, even if a player which inputs the content of the speech data does not select any one of the motion patterns, it is possible to provide a chat with a motion of a character automatically.

The present invention as described above may be applied to not only a chat provided with a display of a character but also a chat executed as one part of a network game. For example, there is a case a plurality of players exchange data in a game wherein the players have one game space in common at the same time. That is, when a player character meets with another player character in the game space, players controlling the player characters respectively may input texts with a key board or the like, exchange greetings, have a small talk, or exchange information about the game content. Accordingly, it is needless to say that the above-described present invention is applied to the network game.

In accordance with a fourth aspect of the present invention, a storage medium has a program recorded thereon, when the program is loaded onto an operating apparatus, the program making the operating apparatus execute the method as described above.

In accordance with a fifth aspect of the present invention, a program makes an operating apparatus execute the method as described above, when the program is loaded onto the operating apparatus.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein:

FIG. 6 is a table showing an example of a data structure of a motion data;

FIG. 11 is a table showing an example of a data structure of a speech and motion pattern data;

FIG. 13A is a table for explaining a method for inputting a motion with a key, and FIG. 13B is a view showing an example of an input rule thereof.

PREFERRED EMBODIMENTS OF THE INVENTION

Hereinafter, a preferred embodiment of the present invention will be explained with reference to figures, as follows.

The present invention will be explained according to an embodiment that the present invention is applied to a game which is generally a so-called network game.

In order to realize the network game, for example, there are five preferred embodiments. First, a game apparatus such as a personal computer, a consumer game machine and so on, which are provided at home is connected to a server through an electronic communication line such as an internet, a private line and so on. Second, a plurality of game apparatuses are combined with each other physically, to provide one system on the whole, for example, an arcade game machine. Third, a plurality of game apparatuses are connected to each other through an electronic communication line, to provide a system comprising a parent apparatus and subsidiary apparatuses. Fourth, each of game apparatuses functions equally, to provide a peer to peer system. Fifth, any one of game apparatuses connected to each other has a function as a server.

The present invention can be applied to any one of the above-described embodiments. Hereinafter, the present invention will be explained according to the first embodiment wherein game apparatuses and a server are connected to each other through an electronic communication line.

Further, the present invention will be explained according to an embodiment wherein the present invention is applied to a chat executed in a network roll playing game that a plurality of players have one game space in common with each other through a network at the same time, and enjoy playing the game. However, it should be understood that the present invention is not limited to the embodiment.

Figure 1:
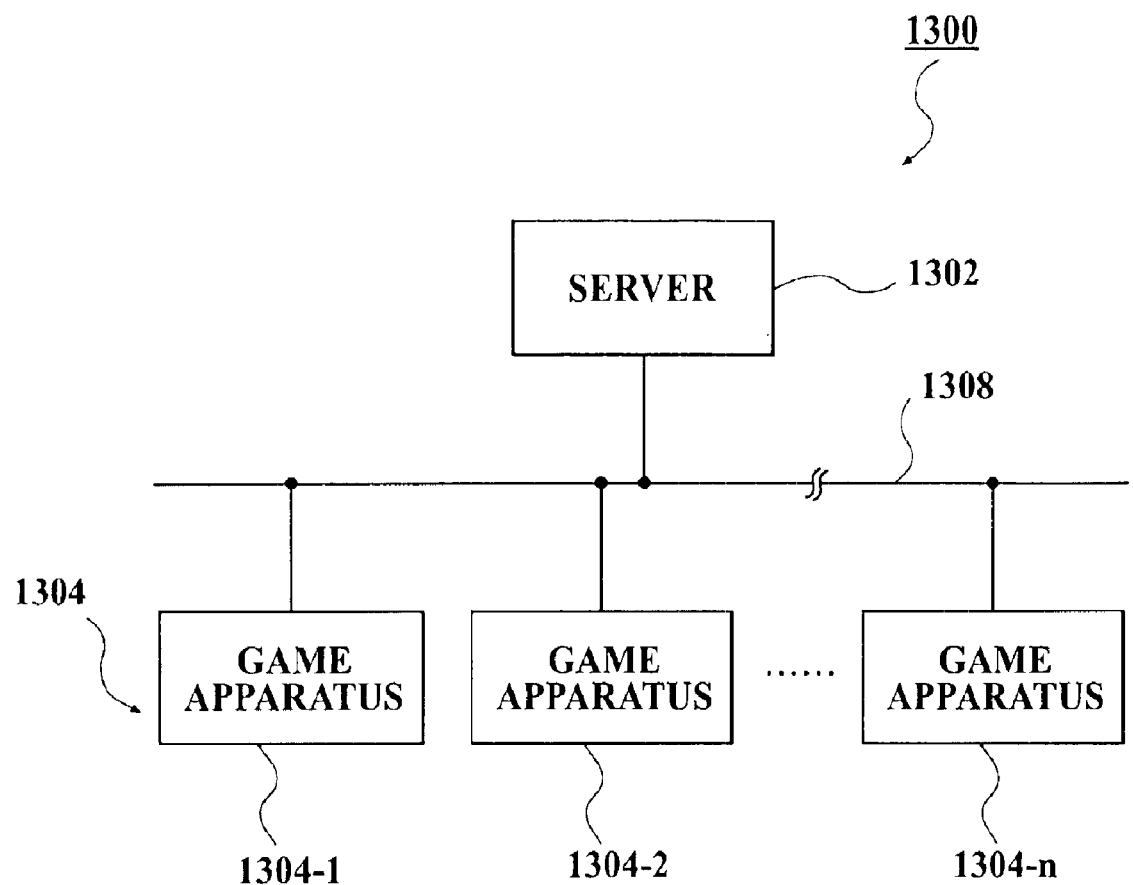
FIG. 1 is a block diagram showing an example of a network system according to an embodiment of the present invention.

FIG. 1 is a schematic block diagram showing a network system 1300 comprising a server 1302 and a plurality of game apparatuses 1304-1 to 1304-n connected to the server 1302 through a network 1308 which is an electronic communication line including a small area network such as a LAN, a wide area network such as an internet, a public network, a private network, a mobile communication network and so on.

The game apparatuses 1304-1 to 1304-n exchange various types of data between each other through the server 1302, and execute a game. Players operating the game apparatuses 1304-1 to 1304-n exchange speech (text) data and motion data between each other, have a communication, and enjoy playing the game.

More specifically, each of the game apparatuses 1304-1 to 1304-n can be realized as a consumer game machine, a consumer game system, a portable game machine, an arcade game machine, an game system, a personal computer, a portable terminal including a portable telephone, a kiosk terminal or the like.

Hereinafter, each of the game apparatuses 1304-1 to 1304-n will be explained, for example, in case of a personal computer.

Figure 2A:
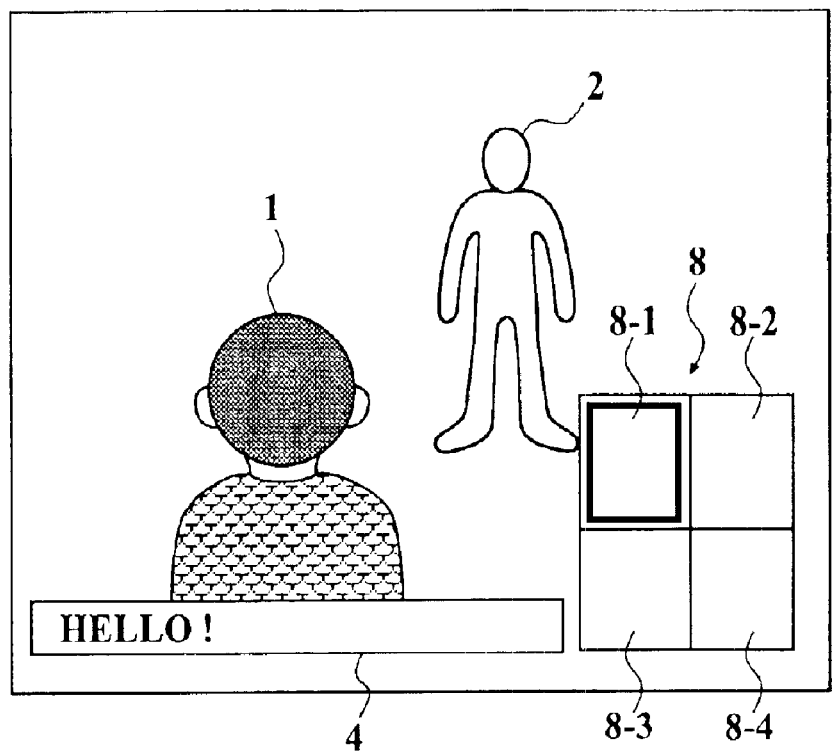
FIGS. 2A and 2B are exemplary display screens according to an embodiment of the present invention.
Figure 2B:
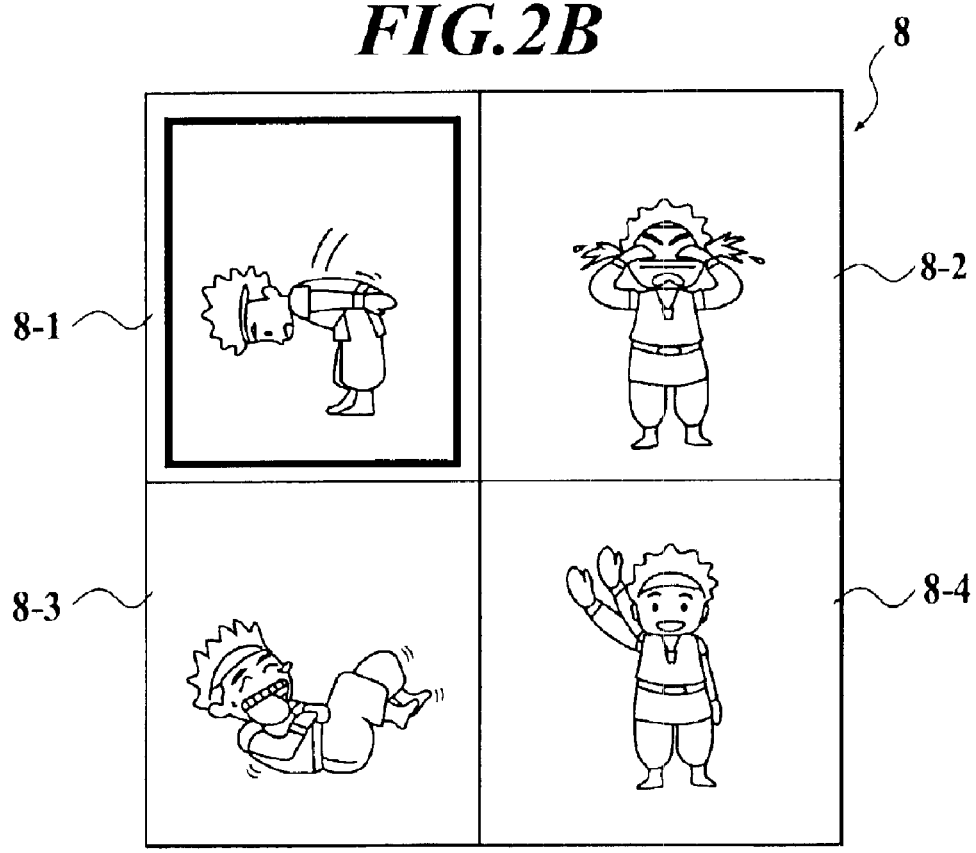
Figure 3:
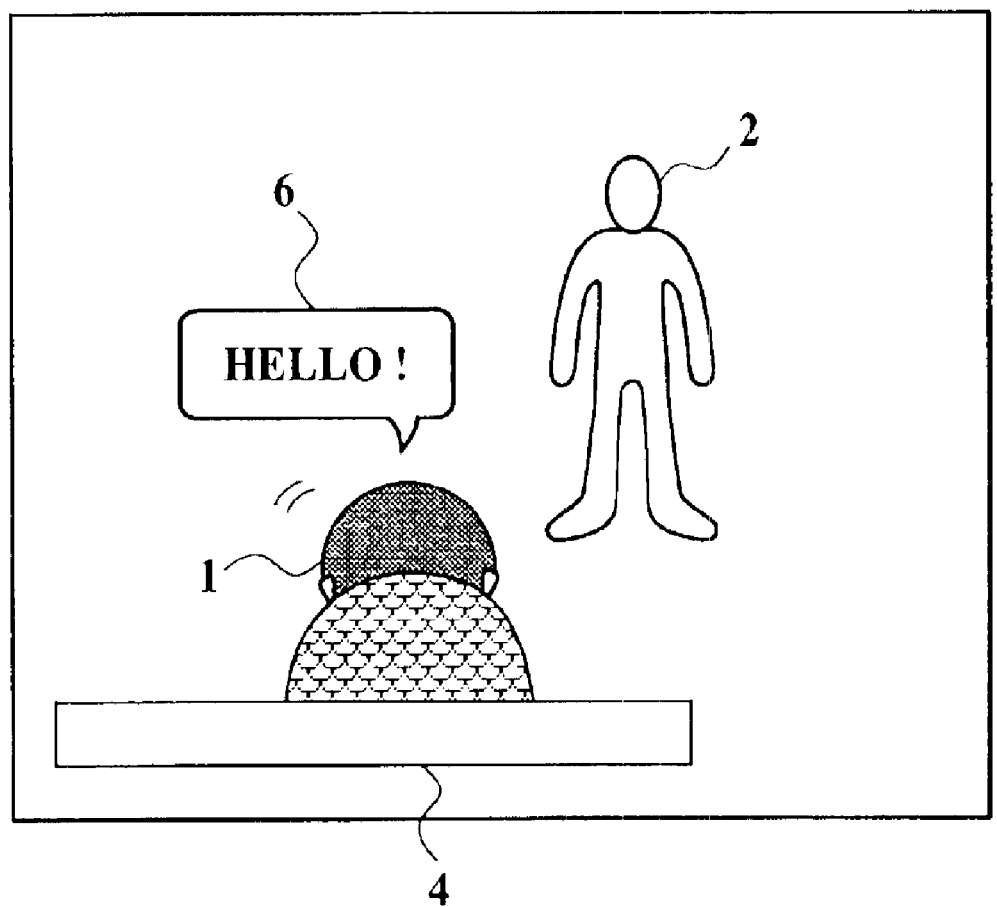
FIG. 3 is an exemplary display screen according to an embodiment of the present invention.
Figure 4:
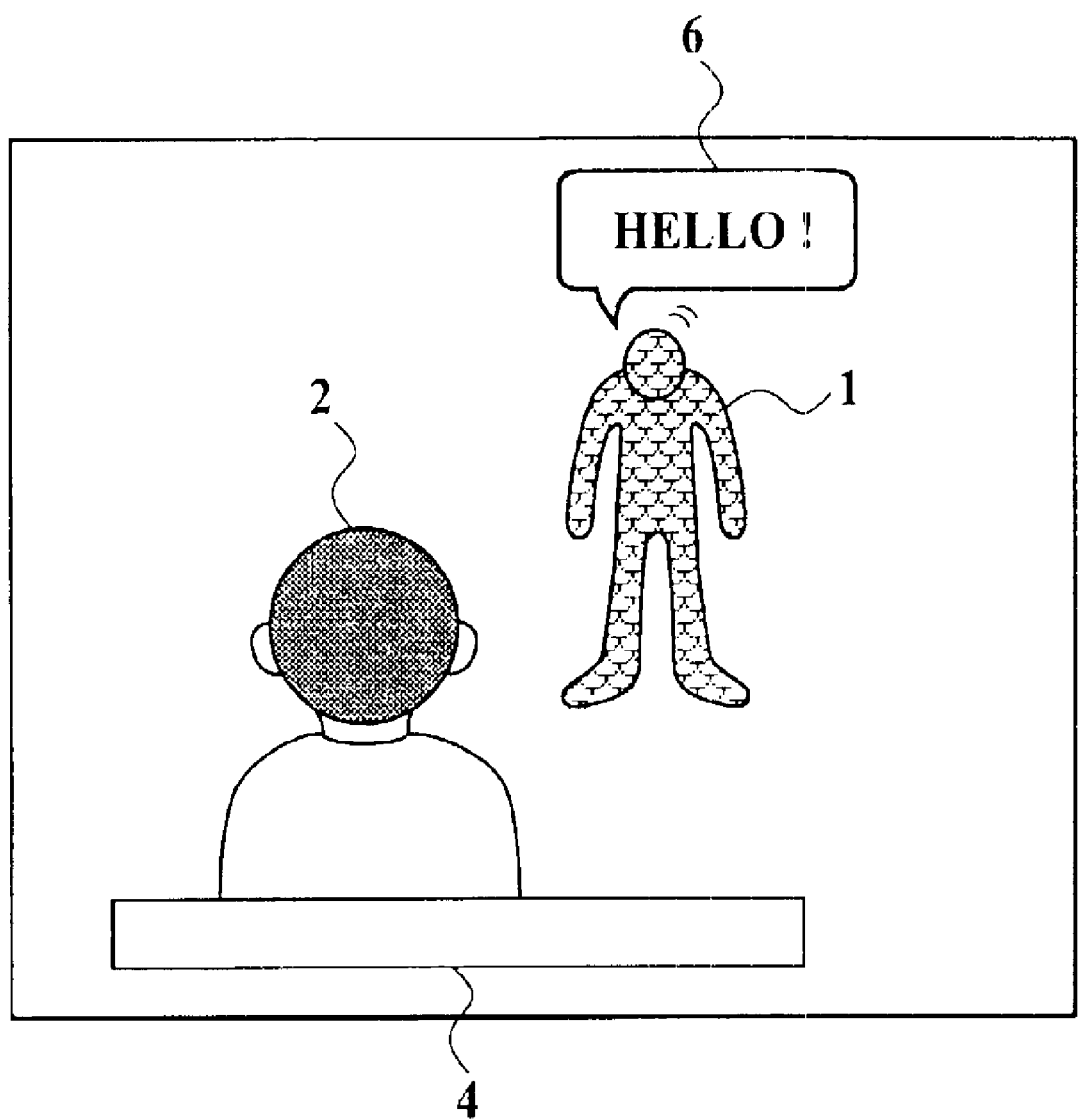
FIG. 4 is an exemplary display screen according to an embodiment of the present invention.

FIGS. 2A to 3 are views showing exemplary display screens displayed on a display of the game apparatus 1304-1, and FIG. 4 is a view showing an exemplary display screen displayed on a display of any one of the game apparatuses 1304-2 to 1304-n.

FIG. 2A is a view showing an exemplary screen displayed on a display of the game apparatus 1304-1 controlling a character 1.

As shown in FIG. 2A, a text input area 4 and an icon group 8 of character motions which can be selected by a player, are displayed on the screen of the game apparatus 1304-1. Hereinafter, the icon group 8 will be called a motion icon group 8. The text input area 4 is an area in which a text inputted with a keyboard or the like is displayed, and in particular, an area in which a speech which the own player character 1 speaks is displayed. The motion icon group 8 includes motion icons 8-1 to 8-4 showing a plurality of types of motions which the own player character 1 takes.

FIG. 2B is an enlarged view showing the motion icon group 8 shown in FIG. 2A.

As shown in FIG. 2B, static images showing various motions are displayed on the motion icons 8-1 to 8-4. The motion icons 8-1 to 8-4 are linked to motion data respectively. That is, when the player selects any one of the motion icons 8-1 to 8-4, the motion data corresponding to the selected motion icon is read out. Then, the motion data is sent with the speech data inputted by the player, to a game apparatus controlling a character 2. Herein, in order to select any one of the motion icons 8-1 to 8-4 of the motion icon group 8, for example, the player clicks a desired one of the motion icons 8-1 to 8-4 with a pointing device or the like.

In FIG. 2A, it is shown the case that the player inputs "HELLO!" in the text input area 4, and selects the motion icon 8-1 of the motion icon group 8 to make the character 1 bow. Further, in FIGS. 2A and 2B, the motion icon 8-1 selected by the player is indicated by a bold frame, clearly, for convenience.

As described above, the speech data (text data) inputted by the player and the motion data selected by the player are sent as the chat data, to the game apparatus, for example, the game apparatus 1304-2 shown in FIG. 1, controlling the character 2 through the server 1302.

Hereinafter, an identification number is corresponded to each motion icon, in order to identify each motion. The identification number will be called a motion number. Therefore, when the player selects any one of the motion icons, the motion number corresponded to the selected motion icon is added to the chat data, and the chat data is sent to the game apparatus 1304-2.

Further, the motion data is corresponded to each motion number and stored in the game apparatus. That is, when the game apparatus 1304-2 receives the motion number, the game apparatus 1304-2 can read out the motion data corresponded to the received motion number, and move the character 1 on the basis of the motion data. Further, when the game apparatus 1302-1 sends the chat data, after sending the chat data, the game apparatus 1302-1 displays the speech data inputted by the player, and moves the character 1 on the basis of the motion data.

Hereinafter, when the player sends the speech data at one time, the player can select only one of the motions. That is, the chart data which is sent at one time includes the speech data and one motion number. Then, when the game apparatus receives the chat data, the game apparatus displays the received speech data, and makes the corresponding character take the motion corresponding to the received motion number.

FIGS. 3 and 4 are views showing exemplary display screens wherein the character 1 speaks the text inputted on the display screen shown in FIG. 2A, and takes the motion, for example, the bow motion, selected on the display screen shown in FIG. 2A.

FIG. 3 is a view showing an exemplary display screen of the game apparatus 1304-1 controlling the character 1. FIG. 4 is a view showing an exemplary display screen of the game apparatus 1304-2 controlling the character 2.

As shown in FIGS. 3 and 4, the character 1 takes the motion selected by the player in the game apparatus 1304-1. Further, at the same time, a speech display area 6, for example, a balloon area, is displayed on the display screen. Therefore, the text which is the speech data, inputted in the text input area 4 is displayed on the speech display area 6, as the speech of the character 1. Hereinafter, the speech data is displayed on the speech display area 6, after the character 1 starts taking a series of motions before the character 2 finishes taking the motions. That is, as shown in FIGS. 3 and 4, the processing system of each of the game apparatuses 1304-1 and 1304-2 starts displaying the speech display area 6 at the same time as the character 1 starts bowing, and finishes displaying the speech display area 6 when the character 1 finishes bowing.

As described above, it is possible to display the charter and the text message (speech data) and make the character take the desired motion while the players have a chat. Accordingly, it is possible to express a feeling which only the text message cannot convey and to emphasize an impression of the text message by the motion of the character.

For example, in case the character speaks "HELLO!" with bowing as compared with the case the character speaks "HELLO!" without taking the motion, that is, with keeping standing up, it is possible to give a more polite impression to the player controlling another game apparatus.

Further, in the network game wherein a plurality of players have one game space in common with each other at the same time, there is a case the characters controlled by the players respectively, which use different languages, meet with each other in the game space. That is, even if the own character meets with another character and the player controlling the own character starts the chat with a player controlling another character, because the player cannot understand the language displayed on the speech display area 6 of another character, the players may be impatient with each other.

However, according to the present invention, even in the case, the player can understand a feeling which another player wants to convey, by a motion of another character. For example, in case the player controlling the character 2 uses a language other than Japanese, even if the character 1 speaks "HELLO!", there is a possibility that the player controlling the character 2 cannot understand what the character 1 speaks. However, because the character 1 bows, or waves his hand, it is possible to convey that the player controlling the character 1 says the greeting to the player controlling the character 2.

Next, the function which can realize the embodiment of the present invention will be explained with reference to FIG. 5, as follows.

Figure 5:
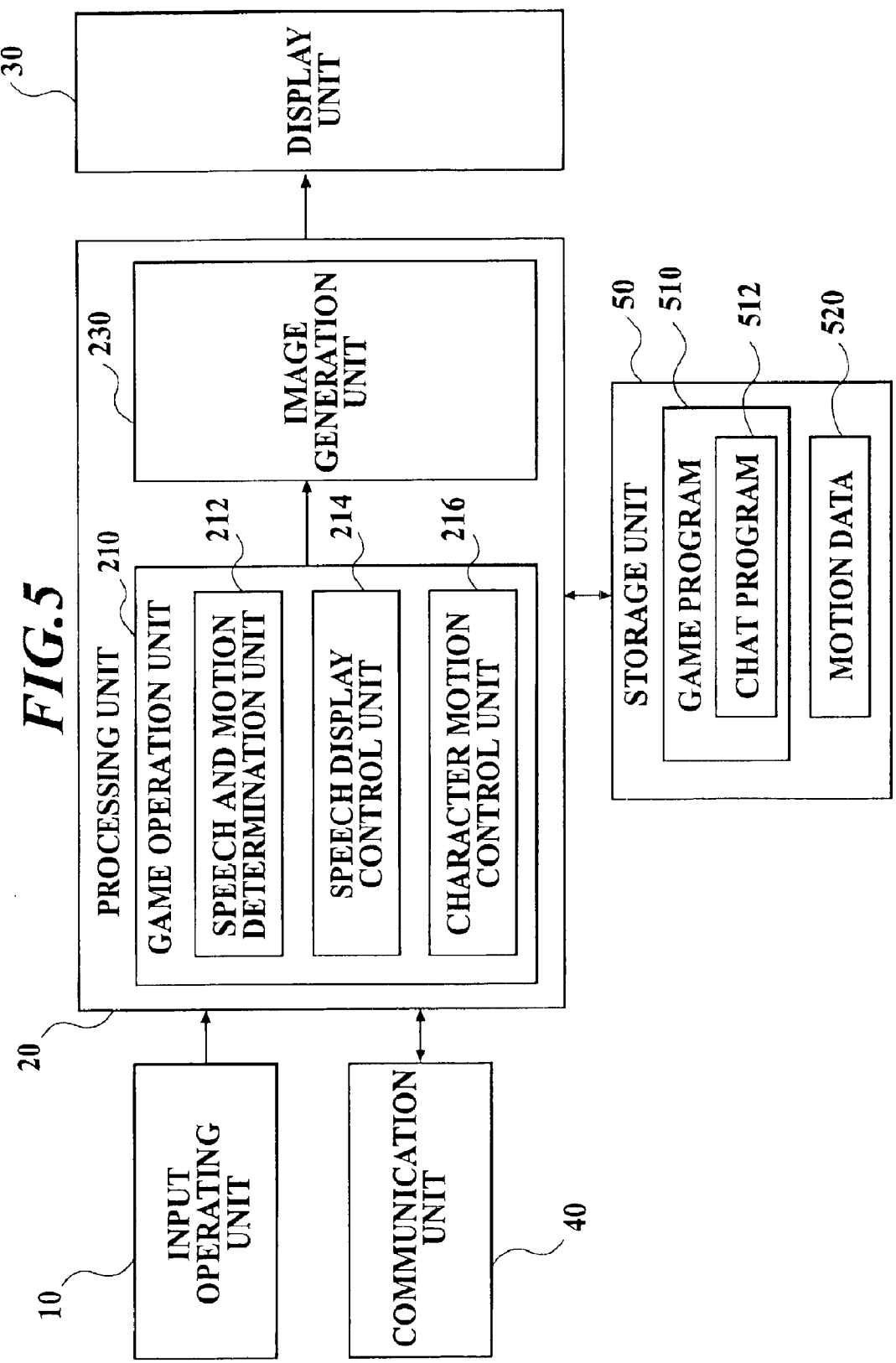
FIG. 5 is a block diagram showing an example of a function block according to an embodiment of the present invention.

FIG. 5 is a block diagram showing an example of a functional block of the game apparatus 1304-1 according to the embodiment of the present invention. As shown in FIG. 5, the functional block of the game apparatus 1304-1 comprises an input operating unit 10, a processing unit 20, a display unit 30, a communication unit 40, and a storage unit 50.

The display unit 30 has a function of displaying game images generated by an image generation unit 230 of the processing unit 20.

The input operating unit 10 is a device for instructing various types of operations concerning a game, inputting the text which the character controlled by the player speaks, selecting the motion which the character controlled by the player takes, instructing to send chat data and so on. For example, the input operation unit 10 includes a keyboard comprising character keys, cursor keys, number keys, various function keys and so on, a pointing device such as a mouse pointer and so on, and other input devises. Therefore, the player inputs operation data with the keyboard, the pointing device or the like. The input operation unit 10 outputs the operation data inputted by the player to the processing unit 20.

The processing unit 20 controls the whole game apparatus, instructs each block of the game apparatus, and processes various types of processing such as a game processing, an image processing, a sound processing and so on, according to a game program 510 stored in the storage unit 50 or the operation data outputted from the input operating unit 10. The processing unit 20 has a function which can be realized by hardware such as a CISI type or RISC type of CPU, a DSP, an IC for reading images, a memory and so on. Further, the processing unit 20 mainly comprises a game operation unit 210 and an image generation unit 230.

The game operation unit 210 performs a processing of executing a game according to the operation data outputted from the input operation unit 10 and the game program 510, a processing of determining speech data and a motion number and generating chat data according to the operation data outputted from the input operation unit 10 and a chat program 512 stored in the storage unit 50, a processing of sending the generated chat data to each of the game apparatuses 1304-2 to 1304-n as a chat companion through the server 1302 according to the communication unit 40, a processing of making an own player character speak and take a motion on the basis of the determined speech data and the determined motion number, a processing of making a corresponding companion player character speak and take a motion on the basis of the speech data and the motion number received from any one of the game apparatuses 1304-2 to 1304-n through the communication unit 40, and so on.

More specifically, the game operation unit 210 comprises a speech and motion determination unit 212, a speech display control unit 214 and a character motion control unit 216.

The speech and motion determination unit 212 determines the operation data, when receiving the operation data from the input operating unit 10, for example, the data inputted with the keyboard or the like. When determining that the operation data is a signal specifying the text, that is, the speech data, the speech and motion determination unit 212 outputs the speech data specified by the operation data to the image generation unit 230 to display the text on the text input area 4. At the time, the speech and motion determination unit 212 outputs an instruction to display the motion icon group 8 to the image generation unit 230. That is, when receiving the text inputted with the input operating unit 10, the speech and motion determination unit 212 instructs the image generation unit 230 to display the inputted text on the text display area 4 and the motion icon group 8 on the screen.

Further, the speech and motion determination unit 212 performs a processing of generating chat data. More specifically, when the speech and motion determination unit 212 determines the text is inputted on the basis of the operation data outputted from the input operating unit 10, the speech and motion determination unit 212 stores inputted text data in a temporary storage memory such as a RAM and so on, and generates speech data on the basis of the text data. On the other hand, when the speech and motion determination unit 212 determines one motion icon is selected on the basis of the operation data outputted from the input operating unit 10, the speech and motion determination unit 212 reads out the motion number corresponding to the selected motion icon, and stores the motion number in the temporary storage memory. Further, when receiving the instruction to send the speech data and the motion number from the input operating unit 10, the speech and motion determination unit 212 generates chat data including the speech data and the motion number stored in the temporary storage memory, a character number for identifying each character, and account data for specifying the game apparatus operating the companion character to which the generated chat data is sent, and outputs the generated chat data to the communication unit 40.

FIG. 6 is a table showing an example of a data structure of a motion data 520 stored in the storage unit 50. In FIG. 6, in order to explain the motion data 520 simply and clearly, only one motion data 520 is shown. However, practically, it is necessary that motion data is provided according to the number of the motion icons 8-1 to 8-4 included in the motion icon group 8.

As shown in FIG. 6, one motion number "M1" is corresponded to and stored in the motion data 520. Further, angle data of each of joints "a", "b" and so on of a character are stored for every key frame such as a first key frame, a second key frame and so on. in the motion data 520. For example, concerning to the joint "a", the angle data (x1a, y1a, z1a), (x2a, y2a, z2a) and so on are stored in the first key frame, the second key frame and so on, and concerning to the joint "b", the angle data (x1b, y1b, z1b), (x2b, y2b, z2b) and so on are stored in the first key frame, the second key frame and so on, in the motion data 520.

If all the characters appearing in the game space have the same joint constitutions as each other, when the angle data of joints of each character are determined as shown in FIG. 6, it is possible to determine the motions of various characters having the different sizes and shapes. Accordingly, each of the game apparatuses 1304-1 to 1304-n can make all the characters take the same motions on the basis of one motion data.

The speech display control unit 214 performs a processing of outputting an instruction to display the speech data included in the chat data or stored in the temporary storage memory, on the speech display area 6 to the image generation unit 230, when receiving a signal indicating that the chat data is sent through the communication unit 40, or when receiving the chat data from any one of the game apparatuses 1304-2 to 1304-n. Further, the speech display control unit 214 counts the time to display the speech display area 6. Then, the speech display control unit 214 outputs an instruction to stop displaying the speech display area 6 to the image generation unit 230, according to the counted time. At the time, the speech display control unit 214 reads out the motion data 520 corresponding to the motion number included in the chat data, and determines the time required for the motion, according to the number of key frames and the number of frames between the key frames stored in the read motion data 520.

The speech display area 6 is displayed around a head of the character which speaks the speech data displayed on the speech display area 6. That is, in case the game apparatus 1304-1 sends the chat data to another game apparatus, the speech display control unit 214 displays the speech display area 6 around the head of the own player character which is controlled by the game apparatus 1304-1. On the other hand, in case the game apparatus 1304-1 receives the chat data from another game apparatus, the speech display control unit 214 displays the speech display area 6 around the head of the character corresponding to the character number included in the received chat data.

The character motion control unit 216 controls the motion of the corresponding character on the basis of the motion data 520. That is, in case the game apparatus 1304-1 sends the chat data to another game apparatus, the character motion control unit 216 controls the motion of the own player character on the basis of the motion data 520 corresponding to the motion number stored in the temporary storage memory. On the other hand, in case the game apparatus 1304-1 receives the chat data from another game apparatus, the character motion control unit 216 controls the motion of the character corresponding to the character number included in the chat data on the basis of the motion data corresponding to the motion number included in the chat data.

More specifically, when the character motion control unit 216 reads the motion data corresponding to the specified motion number out of the storage unit 50, the character motion control unit 216 rotates each joint of the corresponding character according to the angle data of each key frame stored in the motion data. At the time, the character motion control unit 216 performs a processing of interpolating the motion of the character in the frame between the key frames.

For example, in case five frames are provided between a first key frame and a second key frame which are serial key frames, when the character motion control unit 216 calculates the angle difference of each joint between the two key frames, the character motion control unit 216 rotates each joint so as to change smoothly between the five frames from the first key frame to the second key frame. Further, when the character motion control unit 216 calculates the coordinates of each joint, which change as each joint rotates, the character motion control unit 216 outputs the coordinate data to the image generation unit 230.

The interval of the joints is determined according to the character. The detailed data of the distance interval of the joints, the positional relationship between the joints and so on are corresponded to the character number and stored in the storage unit 50 as character data which is not shown in figures.

The image generation unit 230 performs a processing of generating game images on the basis of the instruction signal, various coordinate data, the speech data and so on, outputted from the game operation unit 210. Further, the image generation unit 230 has a function which can be realized by hardware such as a CPU, a DSP, an IC for generating images, a memory and so on.

For example, the image generation unit 230 performs a processing of generating an image wherein the text data outputted from the speech and motion determination unit 212 is displayed on the text input area 4 and the motion icon group 8 is displayed on a corner thereof, a processing of generating an image wherein the speech display area 6 is displayed at a specified position thereof and the speech data is displayed on the speech display area 6 according to the instruction outputted from the speech display control unit 214, a processing of generating an image wherein the corresponding character takes the motion on the basis of the coordinate data outputted from the character motion control unit 216, and so on.

The communication unit 40 has a function of exchanging various data with the game apparatuses 1304-2 to 1304-n and the server 1302. For example, when the communication unit 40 receives the chat data from the speech and motion determination unit 212, the communication unit 40 sends the chat data to the server 1302 according to the predetermined communication protocol. On the other hand, when the communication unit 40 receives the chat data of any one of the game apparatuses 1304-2 to 1304-n from the server 1302, the communication unit 40 converts the chat data to a data having a format which can be processed by each unit of the game apparatus 1304-1, and sends the data to the processing unit 20.

The storage unit 50 stores not only the game program 510 but also the motion data 520. The storage unit 50 has a function which can be realized by hardware such as a CD-ROM, a game cassette, an IC-card, a MO, a flexible disc, a DVD, a hard disc, a memory and so on. As described above, the processing unit 20 performs various processes on the basis of the program, data and so on stored in the storage unit 50.

The game program 510 includes data of a game scenario and each character, data for determining motions of each character and objects according to the instruction data outputted from the input operating unit 10, data for determining a position of a view point in order to generate images according to the progress of the game, and so on. Further, the game program 510 includes a chat program 512 which can realize a chat between the game apparatus 1304-1 and the game apparatuses 1304-2 to 1304-n through the network.

Figure 7:
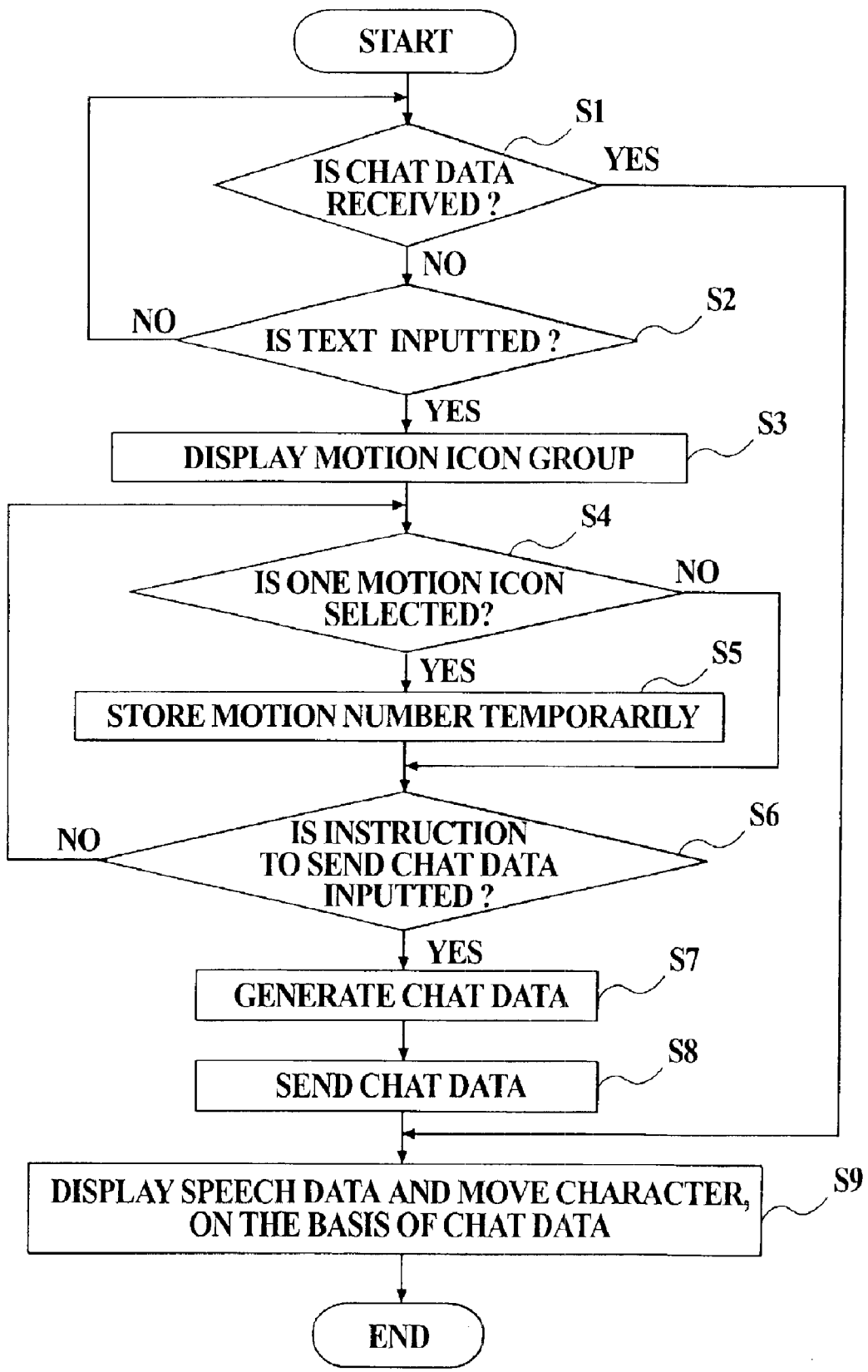
FIG. 7 is a flow chart showing an example of processes concerning a chat processing according to an embodiment of the present invention.

Next, the exemplary processing concerning the chat processing according to the embodiment of the present invention will be explained with reference to a flow chat shown in FIG. 7.

When the game operation unit 210 starts the chat processing, the game operation unit 210 determines whether the game apparatus 1304-1 receives the chat data from any one of the game apparatuses 1304-2 to 1304-n or not (Step S1). When the game operation unit 210 determines that the chat data is received (Step S1; YES), the game operation unit 210 shifts the processing from Step S1 to Step S9. On the other hand, when the game operation unit 210 determines that the chat data is not received (Step S1; NO), the speech and motion determination unit 212 determines whether the text is inputted with the input operating unit 10 or not (Step S2). When the speech and motion determination unit 212 determines that the text is not inputted (Step S2; NO), the game operation unit 210 shift the processing from Step S2 to Step S1, and performs the processing from Step S1 to Step S2 continuously, until the chat data is received or the text is inputted. On the other hand, when the speech and motion determination unit 212 determines that the text is inputted (Step S2; YES), the speech and motion determination unit 212 displays the motion icon group 8 on the display unit 30 (Step S3).

From Step S2 to Step S6 in which the instruction to send chat data to the server 1302 is inputted, the player can always input and delete the text. Even when the text is inputted with the input operating unit 10, or even when the instruction to delete the text is inputted, the speech and motion determination unit 212 changes the speech data stored in the temporary storage memory, on the basis of the text.

Then, the speech and motion determination unit 212 determines whether any one motion icon is selected of the motion icon group 8 or not (Step S4). When the speech and motion determination unit 212 determines that any one motion icon is not selected of the motion icon group 8 (Step S4; NO), the speech and motion determination unit 212 shifts the processing from Step S4 to Step S6. On the other hand, when the speech and motion determination unit 212 determines that any one motion icon is selected of the motion icon group 8 (Step S4; YES), the speech and motion determination unit 212 stores the motion number corresponding to the selected motion icon in the temporary storage memory (Step S5).

Then, the game operation unit 210 determines whether the instruction to send chat data to the server 1302 is inputted with the input operating unit 10 or not (Step S6). When the game operation unit 210 determines that the instruction is not inputted (Step S6; NO), the game operation unit 210 shifts the processing from Step S6 to Step S4. On the other hand, when the game operation unit 210 determines that the instruction is inputted (Step S6; YES), the game operation unit 210 generates chat data including the speech data and the motion number stored in the temporary storage memory, the character number of the own player character, and the account number (Step S7). Thereafter, when the game operation unit 210 outputs the generated chat data to the communication unit 40, the communication unit 40 sends the chat data to the server 1302 (Step S8).

When the communication unit 40 has sent the chat data to the server 1302 in Step S8, or when the game apparatus 1304-1 receives the chat data from any one of the game apparatuses 1304-2 to 1304-n in Step S1, the speech display control unit 214 displays the speech data included in the chat data and makes the corresponding character take the motion corresponding to the motion number included in the chat data (Step S9). Therefore, the game operation unit 210 finishes the chat processing.

Next, an exemplary structure of hardware realizable of each of the game apparatuses 1304-1 to 1304-n according to the embodiment of the present invention will be explained with reference to FIG. 8, as follows.

Figure 8:
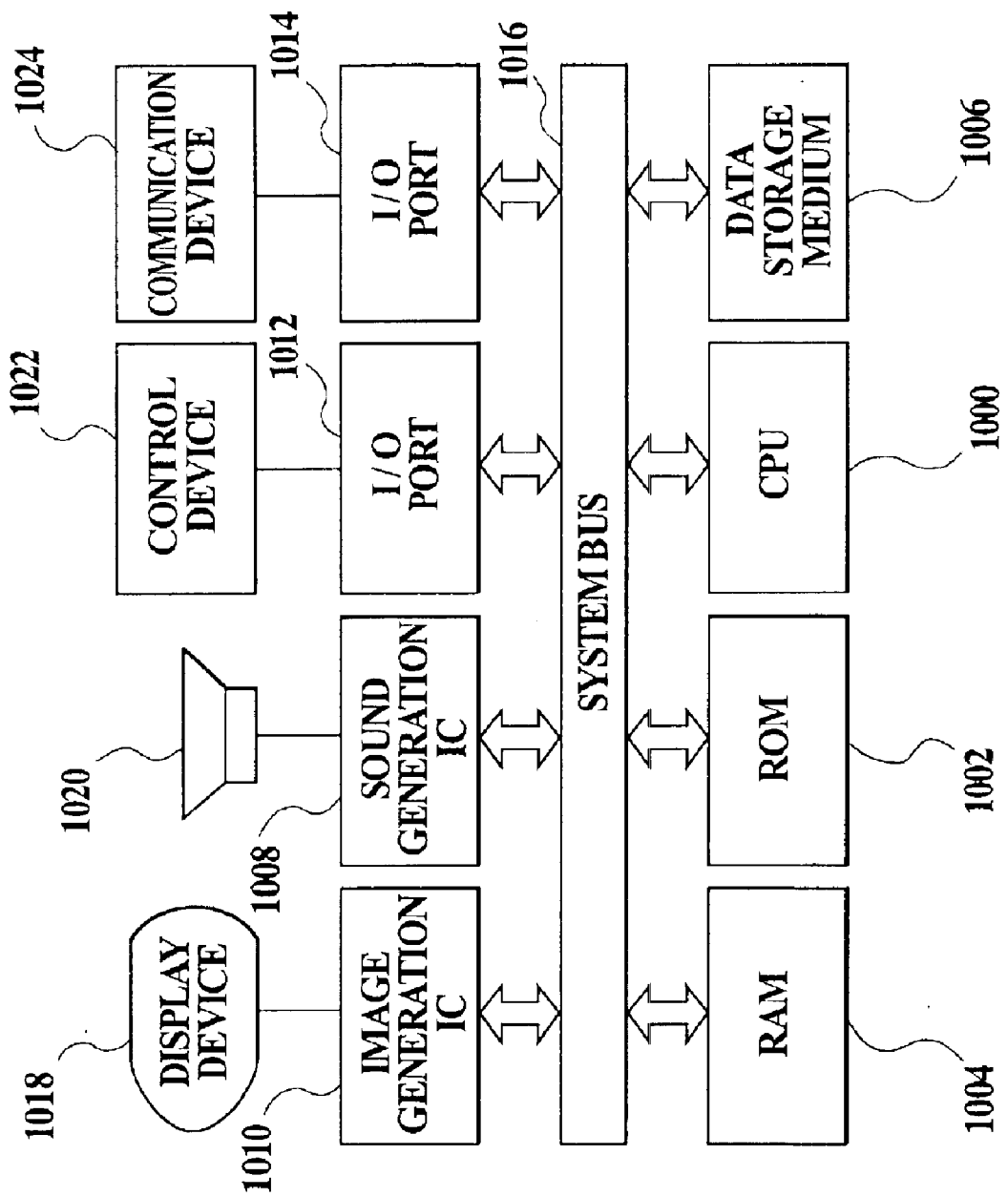
FIG. 8 is a block diagram showing an example of a hardware structure realizable of an embodiment of the present invention.

The game apparatus as shown in FIG. 8 comprises a CPU 1000, a ROM 1002, a RAM 1004, a data storage medium 1006, a sound generation IC 1008, an image generation IC 1010, and I/O ports 1012 and 1014, which are interconnected by a system bus 1016 so as exchange data therebetween. A display device 1018 is further connected to the image generation IC 1010, a speaker 1020 is further connected to the sound generation IC 1008, a control device 1022 is further connected to the I/O port 1012, and a communication device 1024 is further connected to the I/O port 1014.

The data storage medium 1006 stores primarily programs, image data, sound data, play data and so on. The storage unit 50 shown in FIG. 5, corresponds to the data storage medium 1006.

For example, in case the apparatus which can realize the embodiment of the present invention is a computer, a CD-ROM, a DVD or other medium is used as the data storage medium 1006 for storing the game program and other data. In case the apparatus is a consumer game machine, a CD-ROM, a DVD, a game cassette or other medium is used as the data storage medium 1006. In case the apparatus is an arcade game machine, a memory such as a ROM and so on, a hard disc or other medium is used as the data storage medium 1006. In the case, the data storage medium 1006 is realized by the ROM 1002.

The control device 1022 is equivalent to a key board, a pointing device, a game controller, an input operating panel or the like. Therefore, the player uses the control device 1022 in order to input a result of the decision according to an advance of the game. The input operating unit 10 shown in FIG. 5, corresponds to the control device 1022.

The CPU 1000 controls the overall of the apparatus and processes various data, according to the programs stored in the data storage medium 1006, the system program including initialization data for the apparatus and so on, stored in the ROM 1002, signals outputted from the control device 1022, or the like. The processing unit 20 shown in FIG. 5, corresponds to the CPU 1000.

The RAM 1004 is a storage means used as an operating memory of the CPU 1000, or the like. Further, the RAM 1004 stores the particular contents of the data storage medium 1006 or the ROM 1002, operating results of the CPU 1000, or the like, therein.

The sound generation IC 1008 and the image generation IC 1010 are also disposed in such a type of game apparatus, to generate and output sounds and images appropriate to the game. The sound generation IC 1008 is an integrated circuit for generating game sounds such as sound effects, background music and so on, on the basis of data stored in the data storage medium 1006 or the ROM 1002. The game sounds generated by the sound generation IC 1008 are outputted from the speaker 1020. The image generation IC 1010 is an integrated circuit for generating pixel data to be outputted to the display device 1018, on the basis of image data outputted from the RAM 1004, the ROM 1002, the data storage medium 1006 or the like.

The display device 1018 can be realized by a CRT, a LCD, a TV, a plasma display, a liquid crystal plasma display, a projector or the like. The display unit 30 shown in FIG. 5, corresponds to the display device 1018.

The communication device 1024 is a device for communicating various data used by the game apparatus with an external device. If the game apparatus is connected with another game apparatus, the communication device 1024 is used for communicating game programs, predetermined data corresponding to game programs, or other data with another game apparatus, through the communications line. The communication unit 40 shown in FIG. 5, corresponds to the communication device 1024.

Various processing explained with reference to FIGS. 1 to 6, are realized by the data storage medium 1006 which stores programs for executing processing shown in the flow chart of the FIG. 7 and so on, and the CPU 100, the image generation IC 1010, the sound generation IC 1008 and so on which operate according to the programs. Further, the processing performed by the image generation IC 1010 or the like may be performed by the CPU 1000, a general DSP or the like, as software.

As described above, according to the present invention, because the character can not only speak but also move, it is possible to also express a delicate feeling which words cannot convey. Further, because a player can express his feeling in the motion of the character, for example, in case players using the different languages from each other play one game, even if the players cannot understand feelings with each other only in speeches (texts), it is possible that the players are in communication with each other by the motions of the characters.

The present invention has been explained according to the above-described embodiment. However, it should also be understood that the present invention is not limited to the embodiment and various changes and modifications may be made to the invention without departing from the gist thereof.

For example, the present invention has been explained according to the embodiment wherein the player selects any one of the motion icons displayed on the screen and makes the character take the motion corresponding to the selected motion icon. However, it is unnecessary that the member of specifying the motion of the character is not limited to the icon, and the member may adopt another displayed object.

Further, the present invention has been explained according to the embodiment wherein all the motion icons corresponding to the motion patterns are displayed on the screen fixedly. However, in case many types of motion patterns are provided, it is unnecessary that all the motion icons corresponding to the motion patterns are displayed on the screen, and it is needless to say that some of the motion icons may be displayed according to the instruction of the player.

Figure 9:
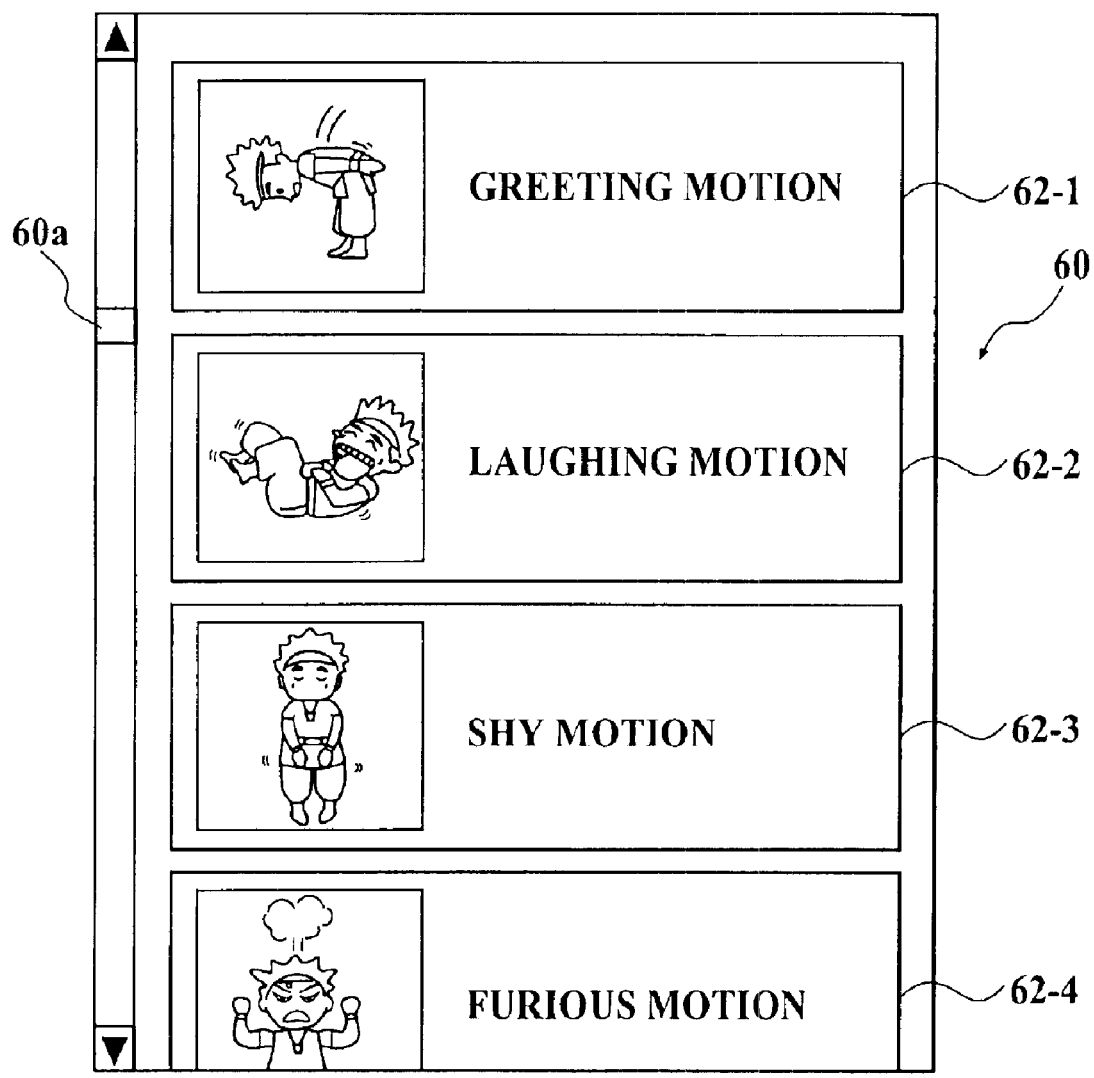
FIG. 9 is a view showing an example of a motion icon displayed on a window screen.

FIG. 9 is a view showing an example of a window screen on which motions of the character are displayed.

As shown in FIG. 9, items 62-1 to 62-4 showing a greeting motion, a laughing motion, a shy motion and a furious motion of the character respectively are displayed on the window 60. When the player controls a scroll bar 60a displayed on a left side of the window 60 with a pointing device such as a mouse pointer and so on, the items 62-1 to 62-4 can be scrolled and displayed on the window 60. Further, when the player clicks any one of the items 62-1 to 62-4, the desired motion of the character can be specified. Accordingly, because the window screen is used, it is possible to display all the motions selectable by the player within the a limited screen area.

Further, the motion icons and so on displayed on the screen may be changed according to the timing concerning the advance state of the game, the state of the chat, the passage of time, or the like. For example, there is a case a plurality of player characters form a party and have a chat in the network roll playing game or the like. In the case, the type of the motion icons displayed on the screen may be changed, the motions selectable by the player may be changed, or some motion icons displayed on the window screen in default, of a plurality of motion icons which can be scrolled on the window screen may be changed, according to the location wherein the party is formed in the game space, the number of characters forming the party, the state of the game which the party faces, or the like. It is needless to say that the motions selectable by the player, or the type of the motion icons displayed on the screen may be changed according to not only the location wherein the formed party is or the state of the game which the party faces, but also the location wherein each character is or the state which each character faces.

Further, the number or the type of motion patterns which the player can use may be changed according to the score of the network game or the like. For example, a player having a low score may specify any one of a few motion patterns in chat, and in reverse, a player having a high score may specify any one of more motion patterns in chat. The number or the type of the motion patterns which the player can use may be changed according to the number of conversations in chat, that is, according to the number of times the chat data is sent and received.

In order to change the type of the motion icons displayed on the screen or the type of the motions selectable by the player according to the condition as the location or the state in the game space, each motion number or each motion icon may be corresponded to each type condition, and they are stored.

Figure 10:
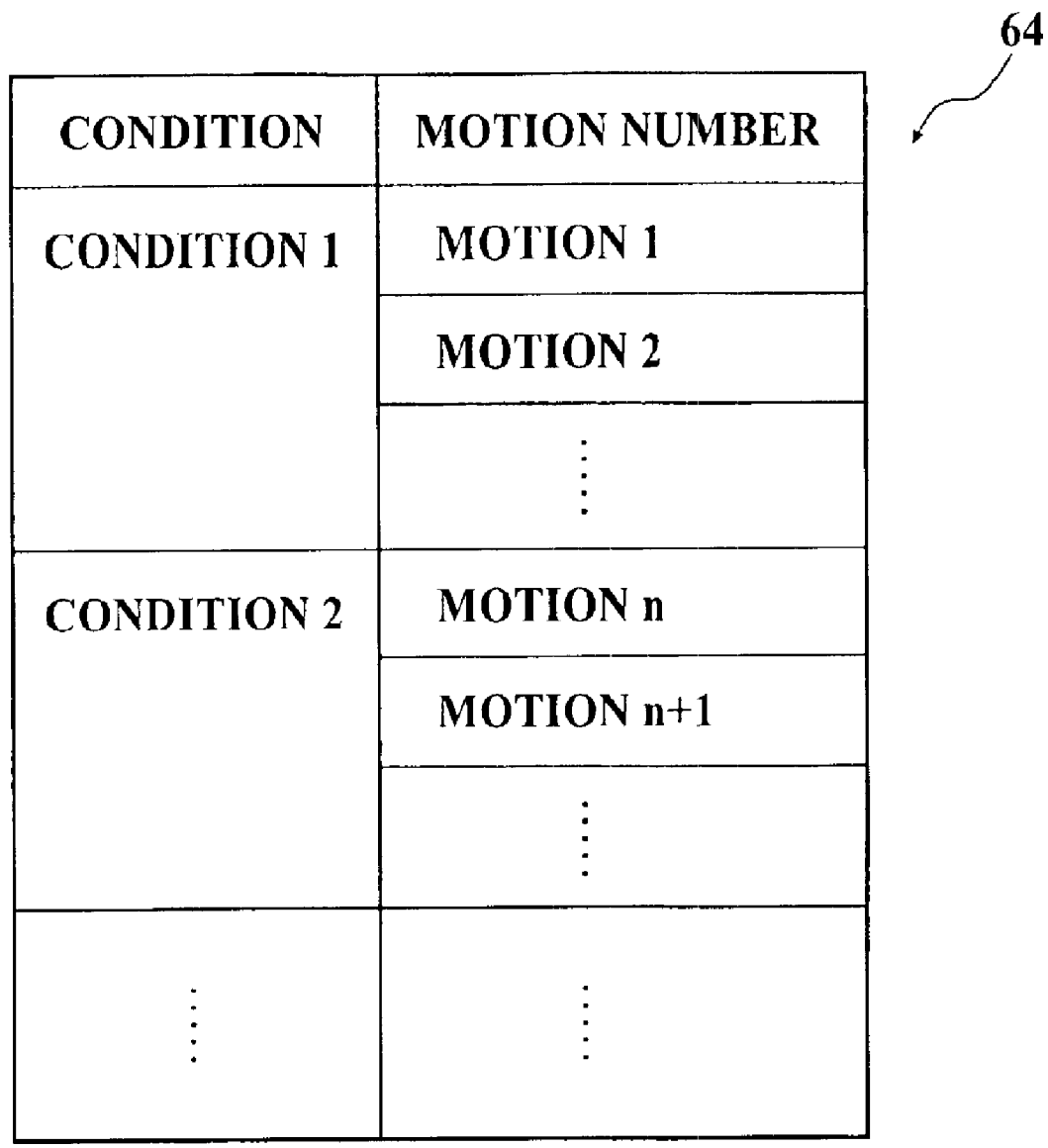
FIG. 10 is a table showing an example of a data structure of a condition corresponding table.

FIG. 10 is a table showing an example of a condition corresponding table 64 wherein the motion number is corresponded to the condition. For example, the motions 1, 2 and so on are corresponded to the condition 1, and the motions "n", "n+1" and so on are corresponded to the condition 2. In order to display a displayed object as the motion icon or the like, on the basis of the condition corresponding table 64 shown in FIG. 10, when the text is inputted during the chat, the condition corresponding table 64 is read out. Then, when the condition corresponding to the text is searched in the condition corresponding table 64, the motion icon corresponding to the motion number corresponded to the searched condition is displayed on the screen.

According to the above-described embodiment, it has been explained that before the chat data is sent, when the player inputs the text and selects the motion, the chat data is generated. However, it is not limited to the embodiment. Some samples of combination of the speech data and the motion number may be previously stored in the storage unit 50, and the player may select any one of the samples freely.

FIG. 11 is a table showing an example of a data structure of a speech and motion pattern data 66 in which the combination pattern of the speech data and the motion number is stored. As shown in FIG. 11, the speech data and the motion number are corresponded to the registration number and stored in the speech and motion pattern data 66.

For example, the combination of the speech data "HELLO!" and the motion number "M1" is corresponded to the registration number "#1" and registered in the speech and motion pattern data 66. In the case, when the player inputs the registration number "#1", the speech and motion determination unit 212 according to the embodiment reads the speech and motion pattern data 66 out of the storage unit 50, reads the speech data and the motion number corresponding to the registration number "#1" out of the speech and motion pattern data 66, and temporarily stores the speech data and the motion number in the temporary storage memory. Then, when the player inputs the instruction to send the chat data, the speech and motion determination unit 212 generates and outputs the chat data to the communication unit 40. That is, when the player only inputs "#1", the player can specify the speech data of the text "HELLO!" and the motion indicated by the motion number "M1".

Further, as shown in FIG. 11, a plurality of combinations of the speech data, the motion number and the output order are corresponded to one registration number, and registered in the speech and motion pattern data 66.

More specifically, the first combination of the speech data "GOODY!" and the motion number "M2" and the second combination of the speech data "THANK YOU." And the motion number "M3" are corresponded to the registration number "#2". Further, the output order "1" and the output order "2" are corresponded to the first combination and the second combination respectively. That is, when the player inputs the registration number "#2", the speech and motion determination unit 212 reads the combinations of the speech data and the motion number corresponding to the registration number "#2" out of the speech and motion pattern data 66, adds flags determining the output order to the combinations respectively, and temporarily stores the combinations in the temporary storage memory. In other words, according to the state, when the player only inputs "#2", the player can specify a plurality of speech data and motions of the character, and specify the output order of the speech data and the motions.

When the chat data is generated, in case a plurality of combinations of the speech data and the motion number are selected in the speech and motion pattern data 66, a plurality of chat data may be generated for the combinations respectively, and outputted in the specified output order. Further, the flags of the output order are added to the combinations of the speech data and the motion number respectively, and one chat data including the flags may be generated for the combinations, and outputted. When the game apparatus receives the chat data including the flags of the output order, the game apparatus determines the flags of the output order, and displays the speech data on the screen in the output order. Herein, at the time, like the above-described embodiment, the time required to display the speech data on the screen is determined so as to be equal to the time required to take the motion.

For example, according to the speech and motion pattern data 66 shown in FIG. 11, the combination of the speech data and the motion is one to one. In the case, the speech data corresponding to the motion is displayed during the equal period to the time required to take the motion. On the other hand, in case a plurality of motions are registered to one speech data, one speech data may be displayed until the character finishes taking all the motions, or until a predetermined time passes.

Further, it is needless to say that a plurality of motion numbers may be included in the chat data which the player sends at a time while the player have a chat. In the case, the player may specify the start timing of each motion and the display timing of the speech data.

Furthermore, it has been explained according to the above-described embodiment that the timing of displaying the speech data and the timing of starting the motion are the same. However, it is unnecessary to be limited to the embodiment. For example, the character corresponding to the speech data may take the motion after the speech data is displayed, or the speech data may be displayed after the character takes the motion. Therefore, the output order of the speech data and the motion may be specified by the player.

Accordingly, the display timing of the speech data, the start order of the motions and so on can be specified by the player. Hereinafter, four methods of specifying the output of various data will be explained.

(1) A method of dividing the speech data according to the number of motions

A method of making the player specify motions and pauses in the speech data according to the number of the motions, and determining the display timing of the speech data, will be explained, as follows.

According to the method, the speech data display control unit 214 divides the speech data on the basis of the pauses in the speech data specified by the player, and displays the divided speech data pieces on the speech display area 6 in order, so as to correspond to the motions of the character respectively. In order to specify the pauses in the speech data, for example, the player provides a space or a special letter between letters. That is, in case the space or the special letter is provided in the speech data, the speech display control unit 214 considers the space or the special letter to be a pause in the speech data. Further, the speech display control unit 214 determines the time required to take each motion on the basis of the motion data of the specified motions, and changes and displays the speech data in order. In the case, the output order of the motions may be specified by the player or determined according to the instruction of the player.

(2) A method of specifying the output order on a private screen

A method of specifying the output order on a private screen will be explained, as follows.

According to the method, when a private screen which is an output order determination unit, on which the output order is specified, is displayed, the player specifies the desired output order on the private screen with a pointing devise such as a mouse pointer, a private pen and so on. The output order determination unit is displayed on the screen when the player inputs the instruction to send the chat data.

Figure 12A:
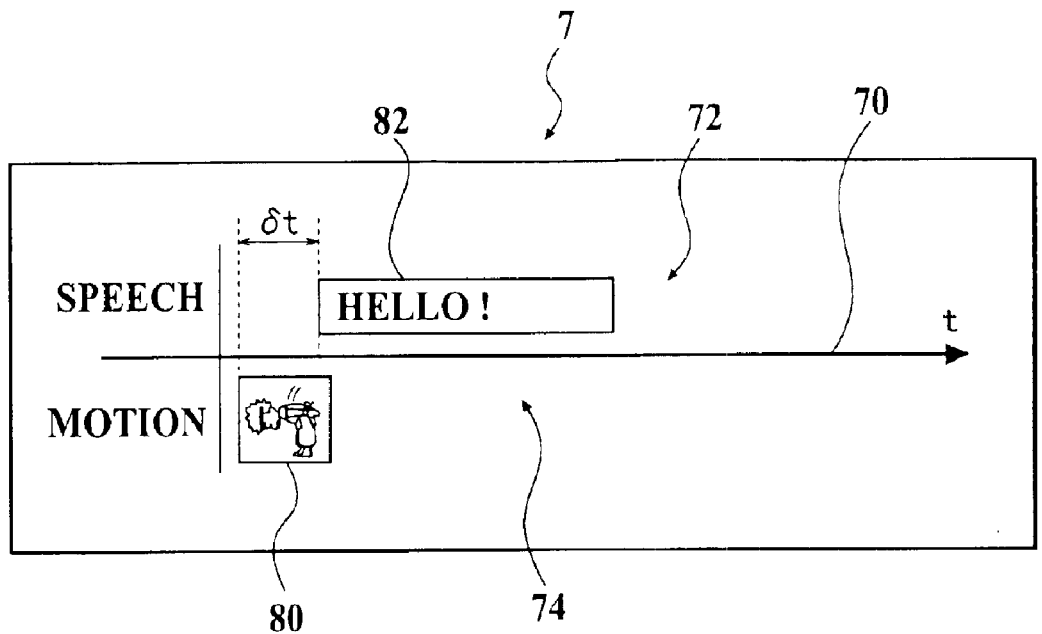
FIGS. 12A and 12B are views showing an example of an output order determination unit.

FIG. 12A is a view showing an example of the output order determination unit 7. The output order determination unit 7 is displayed as a window, on the display screen of the display unit 30. As shown in FIG. 12A, a time axis 70, a speech data arrangement area 72, a motion number arrangement area 74, a speech data icon 82, and a motion icon 80 are displayed on the output order determination unit 7.

The time axis 70 indicates a time passing from left to right in FIG. 12A. The speech data icon 82 is an icon on which the speech data inputted by the player is displayed. In FIG. 12A, the speech data "HELLO!" is displayed on the speech data icon 82. The motion icon 80 is an icon selected by the player. In FIG. 12A, the motion icon 80 is an icon showing the greeting motion. When the player drags and provides the speech data icon 82 and the motion icon 80 at desired positions in the speech data arrangement area 72 and the motion number arrangement area 74, respectively, for example, with a mouse pointer or the like, the player can specify the displaying timing of the speech data and the start timing of the motion.

The speech and motion determination unit 212 determines the arrangement positions of the motion icon 80 and the speech data icon 82 to the time axis 70 on the basis of the output order determination unit 7, and generates the sequence data for specifying the output order of the display timing of the speech data and the start timing of the motion.

For example, in FIG. 12A, the time axis coordinate "t" of a left edge point of the motion icon 80 is "0". Therefore, the time difference "t=δt" is obtained by subtracting the time axis coordinate of the left edge point of the motion icon 80 from a time axis coordinate of a left edge point of the speech data icon 82. When the speech and motion determination unit 212 generates the chat data, the speech and motion determination unit 212 adds "t=δt" to the speech data as the sequence data, and adds "t=0" to the motion number as the sequence data. Accordingly, because the speech and motion determination unit 212 adds the sequence data for specifying the output order to the chat data, it is possible that the game apparatus which receives the chat data displays the speech data and controls the motion of the corresponding character in the specified output order.

The method of determining the output order of the combination pattern of one speech data and one motion number has been explained according to FIG. 12A. However, the player can specify the output order of a plurality of speech data and motions, in the output order determination unit 7.

Figure 12B:
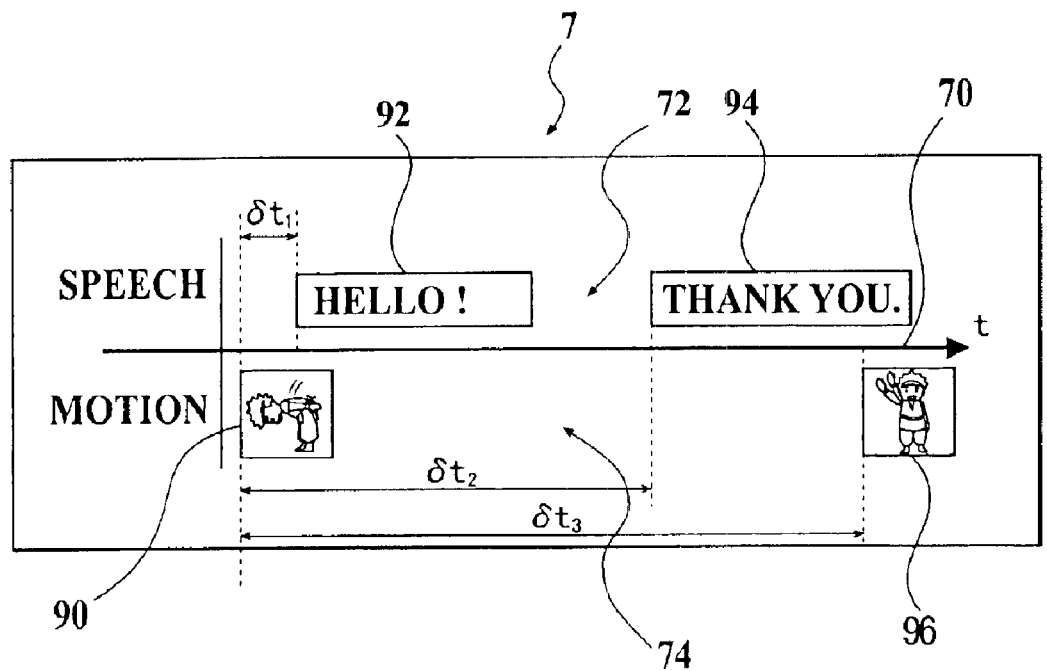

FIG. 12B is a view showing another example of the output order determination unit 7, and in particular an example when the player specifies the output order of two types of speech data and two types of motions.

In order to generate the sequence data in the case, like the case explained with reference to FIG. 12A, the speech and motion determination unit 212 first calculates a time axis coordinate of a left edge point of a motion icon 90 which is at the most left position along the time axis 70, and determines the time axis coordinate "t" to be "0". Then, the speech and motion determination unit 212 calculates the time difference between a time axis coordinate of a left edge point of each of a speech data icon 92 of the speech data "HELLO!", a speech data icon 94 of the speech data "THANK YOU.", and a motion icon 96 of the waving motion, and the time axis coordinate of the left edge point of the motion icon 90, and generates the sequence data on the basis of each time difference. That is, as shown in FIG. 12B, the sequence data of the speech data icon 92 is "t=δt$_1$", the sequence data of the speech data icon 94 is "t=δt$_2$", and the sequence data of the motion icon 96 is "t=δt$_3$". Therefore, it is needless to say that a series of motions and speech data including the output order are registered as the speech and motion pattern data 66.

(3) A method of specifying a display speed of the speech data

A method for making the player specify a display speed of the speech data will be explained, as follows.

According to the method, the player can specify the display speed so as not to display all the speech data at a time but to display the speech data for every letter or for every predetermined number of letters at predetermined intervals, in order to display the speech data on the speech data display area 6. In order to specify the display speed of the speech data, for example, in case the player wants to display the speech data for every letter at predetermined intervals, when the player surrounds the desired letters of the speech data with "$", the surrounded letters may be defined as letters displayed at the specified display speed. Further, the time after one display data is displayed before the next display data is displayed may be defined so as to be specified by "¥" or "¥¥".

For example, "¥" indicates the time interval of "δT", and "¥¥" indicates the time interval of "2×δT". Further, each of commands for specifying the display speed is corresponded to the special sign or the function key, and stored in the command table. In case the special sign or the function key is included in the speech data received from another game apparatus, the command corresponded to the special sign or the function key is read out of the command table, and the speech data is displayed according to the command.

More specifically, in order to display "HELLO!" for every letter at predetermined intervals, when the player inputs "$HELLO!$", the speech display control unit 214 can display "HELLO!" for every letter at predetermined intervals. Further, for example, when the player inputs "$H¥E¥¥LLO!$", the speech display control unit 214 can display "H", and "E" after the time "δT" passes. Then, when the time "2×δT" passes after "E" is displayed, the speech display control unit 214 displays "L". Therefore, because the display speed can be specified by the special sign, the player can express "pause" as an accent of a conversation , and convey a nuance of the speech more clearly. For example, it is possible to express a state the player is thinking contents of a conversation, the player hesitates about speaking, or the like, more clearly, during chat.

(4) A method of specifying a display state of the speech data

A method of making the player specify a font, a color, a size and so on of the speech data which is displayed on the speech display area 6 will be explained, as follows.

More specifically, like the method of making the player specify the display speed of the speech data explained in (3), each of commands for changing the font, the color and so on of the speech data is corresponded to the special sign or the function key, and the commands are stored previously. Therefore, the speech data is displayed according to the commands stored previously. Accordingly, because the player can specify the display state of the speech data, it is possible to display the item or the word which the player wants to emphasize during the chat, more clearly.

According to the above-described embodiment, it has been explained that after the player inputs the text in the text input area 4, the motion icon group 8 is displayed. However, for example, even if the player does not input any text in the text input area 4, when the player pushes a predetermined key, the motion icon group 8 may be displayed. Further, for example, the motion icon group 8 may be always displayed on an edge portion or the like of the screen. In the case, the player can select any one of the motions before inputting the text. Further, the player can send the chat data including only the motion.

Further, according to the above-described embodiment, it has been explained that only when the instruction to send the chat data is inputted, the inputted speech data and the inputted motion number are sent. However, for example, even if the instruction to send the chat data is not inputted, when the text is inputted, or when the motion number is selected, the inputted data may be sent at a real time. In the case, because the speech data and the motion number are sent in the input order of the speech data and the motion number, the speech data and the motion data are outputted in the input order. For example, in case after "HELLO!" is inputted in the text input area 4, the motion number of the bowing motion is selected in the motion icon group 8, the character 1 speaks "HELLO", and after bows.

Further, according to the above-described embodiment, it has been explained that the player selects any one motion of the motion icon group 8 with the pointing device as a mouse pointer and so on. However, for example, the player may specify the motion by inputting the text with keys. In the case, for example, the special key which will be called a registration sign, and the motion number are corresponded to each other, and stored previously.

FIG. 13A is a table showing an example of a key table 100 in which the registration sign and the motion number corresponding to the registration sign are stored. In the case, when the player inputs the registration sign, the speech and motion determination unit 212 according to the embodiment reads out the key table 100, and determines the motion number corresponding to the registration sign on the basis of the key table 100. As described above, in order to realize a member of inputting the speech data and a member of selecting the motion number by one member, it is necessary to provide an input rule for identifying the content of data inputted with the member.

FIG. 13B is a view showing an example of the input rule. That is, the FIG. 13 shows a method of dividing the registration sign for specifying the motion number from the speech data with a space, and distinguishing the motion number from the speech data.

As shown in FIG. 13B, for example, the player first inputs "+b", and after " "(space), and further after "HELLO!". In the case, the letters before " "(space) are determined to be the registration sign, and the letters after " "(space) are determined to be the speech data. When "+b HELLO!" is inputted, the game operation unit 210 of the game apparatus 1304-1 reads out the key table 100 shown in FIG. 13A, reads out the motion number corresponding to the inputted registration sign out of the key table 100, and stores the motion number in the temporary storage memory. Further, the game operation unit 210 stores the letter data determined to be the speech data, as the speech data in the temporary storage memory. Accordingly, it is possible that the corresponding character bows with speaking "HELLO!".

Further, the combination of "+" and an alphabet in the text string inputted in the text input area 4 may be determined to be the registration sign. In the case, it is unnecessary to input " "(space), and there is no problem even if the registration sign is inserted in any position of the text string. Further, in the case, when the registration sign is inputted before the speech data, that is, on the left side of the speech data, after the corresponding character takes the motion corresponding to the registration sign, the speech data is displayed. On the other hand, when the registration sign is inputted after the speech data, that is, on the right side of the speech data, after the speech data is displayed, the corresponding character takes the motion corresponding to the registration sign. Therefore, the output order may be specified according to the input order of the registration sign and the speech data.

Further, according to the above-described embodiment, it has been explained that the player specifies the motion which the own player character takes, separately from inputting the speech data. However, it is not limited to the embodiment. The motion which the own player character takes may be automatically specified according to the content of the speech data. That is, it has been explained that the motion data and the motion number are corresponded to each other and stored together, according to the above-described embodiment. However, the motion data and the word may be corresponded to each other and stored together. For example, the word such as "HELLO!", "GOOD MORNING!" and so on, and the motion data of bowing are corresponded to each other and stored together. Therefore, in case the speech data received from any one of the game apparatuses 1304-2 to 1304-n includes the word such as "HELLO!", "GOOD MORNING!" and so on, the motion data corresponding to the word is read out, and the corresponding character bows on the basis of the motion data. Accordingly, because the motion is automatically specified according to the speech data, it is possible that the player have a chat with a motion without performing a complicated operation.

As described above, in case the motion can be automatically specified according to the speech data, an icon or the like for determining whether the motion pattern of the character is added to the chat data or not may be displayed. In the case, the player may determine whether the character takes the motion or not when sending the chat data. Further, the player which receives the motion data may determine whether the character takes the motion or not.

Further, it has been explained that the static images showing the motions are displayed on the motion icon group 8 according to the above-described embodiment. However, for example, animations showing the motions may be displayed on the motion icon group 8. In the case, the player can understand a specific state of the motion.

Further, it has been explained that each of the game apparatuses 1304-1 to 1304-n stores the motion data 520 and sends or receives the motion number, according to the above-described embodiment. However, for example, the server 1302 may store the motion data 520. In the case, the serve 1302 may receive the motion number sent from each of the game apparatuses 1304-1 to 1304-n, and send the motion data 520 corresponding to the motion number to each of the game apparatuses 1304-1 to 1304-n. Further, each of the game apparatuses 1304-1 to 1304-n may send the motion data to another game apparatus directly.

Further, it has been explained that the text is inputted in the text input area 4 with the key board, to input the speech data, according to the above-described embodiment. However, for example, the speech data which the player can use while playing the game may be previously stored. In the case, when a list of the speech data may be displayed on a pull down menu or the like, the player may select any speech data of the list, and thereby the text may be inputted. Accordingly, because the speech data is previously stored, the player can send the chat data more speedy. Further, the identification number may be added to the speech data stored previously, and sent or received.

Further, it has been explained that the text is inputted and outputted, according to the above-described embodiment. However, for example, the sound may be inputted and outputted. Further, the size, the color and the font of the text displayed on the speech display area 6, the size, the color and the shape of the speech display area 6 which is a balloon, and so on may be changed according to the character, the position in the game space, the instruction inputted by the player or the like. Further, it is needless to say that the present invention is applied to not only the chat performed as one part of the network game but also the chat it self.

According to the present invention, the following effects will be indicated.

As described above, because not only the speech can be outputted but also the character can take the motion during the chat, it is possible to express a feeling, a nuance and an impression which only a word cannot express, in the motion of the character. Further, because a feeing, a nuance and an impression can be expressed in the motion of the character, for example, when players using different languages have a chat with each other, even if the players cannot understand speeches (texts) with each other, the players can understand contents of exchanged messages by the motion of the character. Further, because the combinations of the speech data and the content of the motion are stored previously, it is possible to send chat data more quickly. Further, because the output timing of the motion and the speech data can be specified by a player, it is possible to convey a nuance of the speech of the player to another companion player more plainly.

The entire disclosure of Japanese Patent Application No. Tokugan 2001-159030 filed on May 28, 2001 including specification, claims, drawings and summary are incorporated herein by reference in its entirety.

What is claimed is:

1. A method for providing an electronic chat between a first apparatus controlling a first own player character and a second apparatus controlling a second own player character, through a network, comprising:

inputting a speech data to the first apparatus;

inputting a motion pattern of the first own player character to the first apparatus;

sending a chat data including the speech data and the motion pattern to the second apparatus;

receiving a chat data sent from the second apparatus;

outputting a speech data included in the chat data received from the second apparatus; and moving and displaying the second own player character on the basis of a motion pattern included in the chat data received from the second apparatus;

storing a plurality of motion patterns and a plurality of predetermined displayed objects which are corresponded to each other, in the first apparatus; and displaying some of the predetermined displayed objects, which are determined according to a predetermined condition.

2. The method as claimed in claim 1, comprising:

storing the plurality of motion patterns and a plurality of predetermined input operations which are corresponded to each other, in the first apparatus; and determining any one of the motion patterns, which corresponds to any one of the predetermined input operations, to be inputted to the first apparatus, when the one of the predetermined input operations is inputted to the first apparatus.

3. The method as claimed in claim 2, comprising:

determining any one of the motion patterns, which corresponds to any one of the predetermined displayed objects, to be inputted to the first apparatus, when the one of the predetermined displayed objects is inputted to the first apparatus.

4. The method as claimed in claim 2, comprising:

restricting the motion patterns which can be selected, by a predetermined condition.

5. The method as claimed in claim 1, comprising:

sending the chat data further including a sequence data indicating an output order of the speech data and the motion pattern to the second apparatus; and controlling outputting the speech data and moving and displaying the second own player character, on the basis of a sequence data included in the chat data received from the second apparatus.

6. The method as claimed in claim 5, comprising:

storing a plurality of speech and motion patterns including at least the speech data, the motion pattern and the sequence data in the first apparatus;

selecting any one of the speech and motion patterns stored in the first apparatus; and sending the chat data including the one selected of the speech and motion patterns to the second apparatus.

7. The method as claimed in claim 5, comprising:

generating the sequence data on the basis of an input order of the speech data and the motion pattern.

8. The method as claimed in claim 1, comprising:

inputting the speech data including a predetermined output control code to the first apparatus; and outputting the speech data in an output state and/or at an output speed, determined according to a predetermined output control code included in the speech data received from the second apparatus.

9. The method as claimed in claim 1, comprising:

outputting the speech data in an output state and/or at an output speed, determined according to the motion pattern included in the chat data received from the second apparatus.

10. The method as claimed in claim 1, comprising:

analyzing a content of the speech data included in the chat data received from the second apparatus; and moving and displaying the second own player character on the basis of the motion pattern corresponding to the content of the speech data.

11. A storage medium having a program recorded thereon, when the program is loaded onto an operating apparatus, the program making the operating apparatus execute the method as claimed in any one of claims 1 to 10.

12. A program, when the program is loaded onto an operating apparatus, to make the operating apparatus execute the method as claimed in any one of claims 1 to 10.

13. An apparatus for controlling an own player character, and providing an electronic chat with another apparatus controlling another own player character, through a network, comprising:

a section for inputting a speech data thereto;

a section for inputting a motion pattern of the own player character thereto;

a section for sending a chat data including the speech data and the motion pattern to another apparatus;

a section for receiving a chat data sent from another apparatus;

a section for outputting a speech data included in the chat data received from another apparatus;

a section for moving and displaying another own player character on the basis of a motion pattern included in the chat data received from another apparatus;

a section for storing a plurality of motion patterns and a plurality of predetermined displayed objects which are corresponded to each other, in the first apparatus; and a section for displaying some of the predetermined displayed objects, which are determined according to a predetermined condition.

14. A server connectable to first and second apparatuses each of which comprises a section for sending a speech data and a motion code of an own player character, a section for receiving a predetermined data, a section for outputting a speech data received, and a section for moving and displaying another player character on the basis of a motion data received, a section for storing a plurality of motion patterns and a plurality of predetermined displayed objects which are corresponded to each other, in the first apparatus; and a section for displaying some of the predetermined displayed objects, which are determined according to a predetermined condition, through a predetermined communication line, the server comprising:

a section for storing a plurality of motion data and a plurality of motion codes which are corresponded to each other;

a section for receiving the speech data and the motion code sent from the first apparatus;

a section for extracting any one corresponding to the motion code received, from the motion data stored; and a section for sending the motion data extracted and the speech data received, to the second apparatus.

* * * * *